United States Patent
Snyder

(10) Patent No.: US 6,389,268 B1
(45) Date of Patent: May 14, 2002

(54) ELECTRONIC DEVICE HOLDERS WITH DISPLAY PANEL MAGNIFIER

(75) Inventor: Thomas Snyder, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/364,183

(22) Filed: Jul. 29, 1999

(51) Int. Cl.[7] .................................................. H04B 1/38
(52) U.S. Cl. ........................ 455/90; 455/566; 455/575; 379/446; D14/251
(58) Field of Search .......................... 455/90, 575, 566, 455/569, 550; 379/446, 447, 449, 450, 451, 454, 455; 359/440, 441, 802, 803, 804, 805, 809, 818, 827, 896

(56) References Cited

U.S. PATENT DOCUMENTS

| | | | | |
|---|---|---|---|---|
| D243,329 S | * | 2/1977 | Snarksi | D16/54 |
| 4,901,852 A | * | 2/1990 | King | 206/320 |
| 4,991,935 A | * | 2/1991 | Sakurai | 359/804 |
| 5,075,799 A | * | 12/1991 | Pine et al. | 359/896 |
| D324,529 S | * | 3/1992 | Moriyama | D16/135 |
| 5,426,825 A | * | 6/1995 | Soren et al. | 24/3.12 |
| 5,818,634 A | * | 10/1998 | Richard et al. | 359/565 |
| 5,956,399 A | * | 9/1999 | Whitley et al. | 379/446 |
| 6,041,924 A | * | 3/2000 | Tajima | 206/320 |
| 6,067,459 A | * | 5/2000 | Lincoln et al. | 455/566 |
| 6,073,034 A | * | 6/2000 | Jacobsen et al. | 455/566 |
| 6,082,535 A | * | 7/2000 | Mitchell | 206/320 |
| 6,088,240 A | * | 7/2000 | Steinhoff et al. | 361/814 |
| 6,137,525 A | * | 10/2000 | Lee et al. | 348/14 |
| 6,201,867 B1 | * | 3/2001 | Koike | 379/433 |
| 6,269,258 B1 | * | 7/2001 | Peiker | 455/569 |

FOREIGN PATENT DOCUMENTS

| | | |
|---|---|---|
| DE | 2003827 | 3/1995 |
| FR | 2494878 | 5/1982 |
| JP | 09247774 | 9/1997 |
| JP | 09284365 | 10/1997 |
| JP | 10214135 | 8/1998 |
| JP | 10257148 | 9/1998 |

* cited by examiner

Primary Examiner—Dwayne Bost
Assistant Examiner—Joy K. Contee
(74) Attorney, Agent, or Firm—Myers Bigel Sibley & Sajovec

(57) ABSTRACT

Electronic device holders, such as vehicle cradles and holsters are provided with optical elements that are configured to overlie and magnify the display panel of an electronic device supported thereby. An elongate, adjustably bendable arm may be utilized to allow a user to maneuver an optical element to any of a plurality of positions relative to an electronic device display panel.

13 Claims, 4 Drawing Sheets

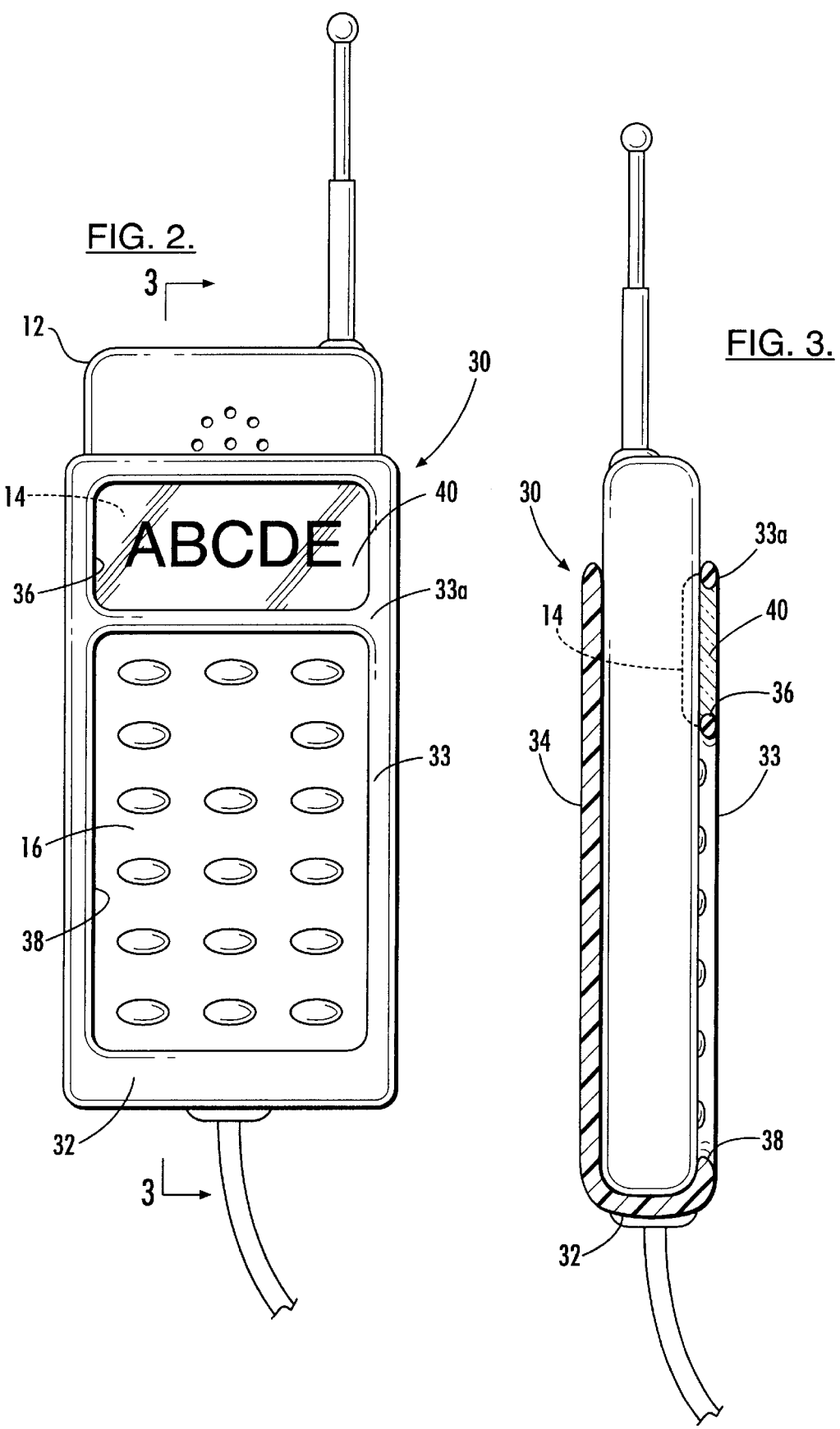

ELECTRONIC DEVICE HOLDERS WITH DISPLAY PANEL MAGNIFIER

FIELD OF THE INVENTION

The present invention relates generally to electronic devices and, more particularly, to electronic device holders.

BACKGROUND OF THE INVENTION

Portable telecommunications devices, such as radiotelephones (e.g., cellular telephones), have become increasingly popular for both personal and commercial use. With their increase in popularity, radiotelephones have also been undergoing miniaturization to facilitate storage and portability. Indeed, some contemporary radiotelephone models are only 9–12 centimeters in length. Other electronic devices such as pagers are also undergoing miniaturization. Pagers are compact radio receivers, typically incorporating a display panel, that may be carried by a person, to receive and display short radio messages directed to that pager.

Portable radiotelephones are frequently placed in a holder, often referred to as a cradle, when used in a vehicle. These cradles allow radiotelephones to be connected to speakerphones, vehicle power supplies, externally mounted antennas, and auxiliary transmitters. Holsters for attaching electronic devices such as pagers to a person's clothing are also becoming popular.

Unfortunately, the display panel of a radiotelephone mounted within a vehicle cradle may be difficult for a vehicle operator to view because of the distance from the operator to the cradle. This problem can be compounded by the miniaturization of radiotelephones and the correspondingly decreasing size of display panels. Similarly, the display panel of a pager within a holster attached to a person may be difficult to read because of the distance from the person's eye to the holster.

Magnification devices attached directly to radiotelephones are known. For example, German Patent No. DE-2003827 to Dafcik et al. describes a convex protective cover that overlies an LCD display of a mobile phone to achieve a lens effect. Japan Patent No. JP-0094273 describes a convex shaped transparent display cover that overlies a portable telephone display. Japan Patent No. JP-0055944 describes a lens group mounted on top of an LCD module. Unfortunately, these magnification devices are attached directly to a portable telephone. As a result, magnification of a portable telephone display may occur even when the portable telephone is in a user's hand. Magnification of a portable telephone display at a close distance may be unnecessary and may be distracting to a user.

Techniques for enlarging characters displayed within a mobile telephone display when the mobile telephone is mounted within a vehicle adapter are also known. For example, Japan Patent No. JP-0091454 describes electronic circuitry that detects when a mobile telephone is connected to a vehicular adapter and electronically enlarges displayed characters for easier reading. Unfortunately, the addition of character enlarging circuitry can increase the complexity of electronic devices such as mobile telephones and can increase manufacturing costs. Furthermore, less information can be displayed within a given display area when characters are enlarged within the display.

SUMMARY OF THE INVENTION

In view of the above, it is an object of the present invention to facilitate viewing of an electronic device display panel when the electronic device is mounted within a holster or vehicle cradle.

It is another object of the present invention to facilitate reduction in costs associated with electronic device manufacturing.

These and other objects of the present invention can be provided by a vehicle cradle for supporting a portable electronic device, such as a radiotelephone, that includes an optical element that is configured to overlie and magnify the display panel of the electronic device supported within the cradle. The optical element may be a lens having one or more convex or concave elements.

According to another embodiment of the present invention, an elongate, adjustably bendable arm is secured to a vehicle cradle. An optical element is secured to a distal end of the arm and is configured to magnify the display panel of an electronic device disposed within the cradle. The arm preferably has a gooseneck shaft that is configured to allow the optical element to be maneuvered to any of a plurality of positions relative to the cradle.

According to another embodiment of the present invention, a holster for a portable electronic device, such as a pager, includes an optical element that is configured to magnify the display panel of an electronic device within the holster.

Vehicle cradles and holsters incorporating an optical element according to the present invention can facilitate easier viewing of a display panel of an electronic device. As such, user interaction with portable electronic devices such as radiotelephones and pagers can be enhanced. Furthermore, user interaction can be enhanced without increasing manufacturing costs of electronic devices.

BRIEF DESCRIPTION OF THE DRAWINGS

FIG. 2 is a front plan view of a vehicle cradle for supporting a portable radiotelephone according to an embodiment of the present invention.

FIG. 3 is a side section view of the vehicle cradle of FIG. 2 taken along lines 3—3.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the figures.

Figure 1:
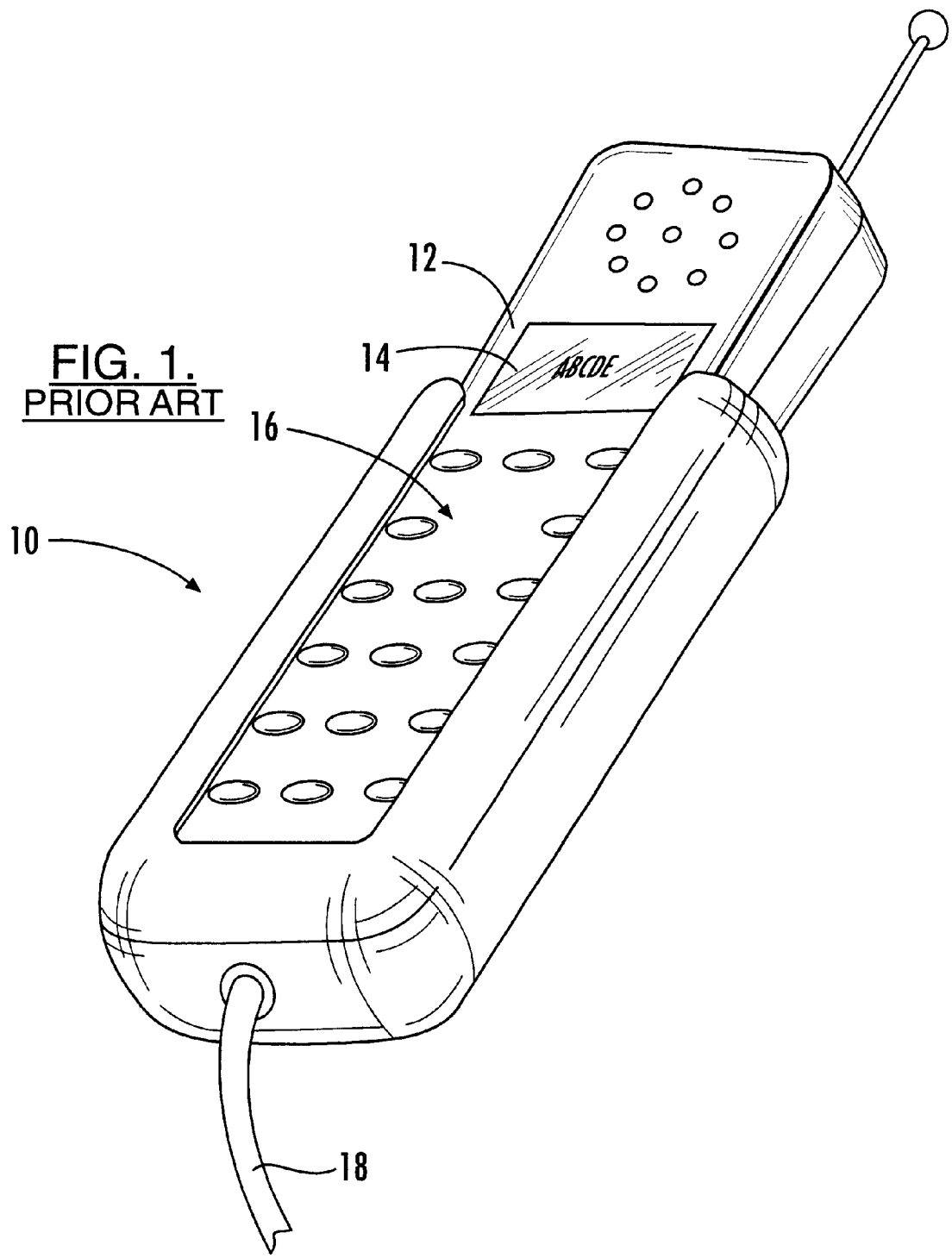
FIG. 1 is a perspective view of a conventional vehicle cradle supporting a portable radiotelephone.

Referring now to FIG. 1 a conventional vehicle cradle 10 for supporting a portable radiotelephone 12 is illustrated.

The illustrated cradle 10 has an open front that allows a user to view the radiotelephone display panel 14 and access the radiotelephone keypad 16. A latching mechanism (not shown) may be provided to help retain the radiotelephone 12 within the cradle 10 during vehicle operation.

The illustrated cradle 10 includes one or more contacts (not shown) for electrically connecting the radiotelephone 12 to external devices via electrical cabling 18. As is known to those of skill in the art, vehicle cradles for radiotelephones can provide access to external power and facilitate charging of a radiotelephone while held in a cradle. A vehicle cradle may also provide means for connecting to an external microphone, external speaker and external control software to enable the radiotelephone to operate in a hands-free mode.

Referring now to FIGS. 2 and 3, a vehicle cradle 30 for supporting a portable electronic device, such as a radiotelephone, according to one embodiment of the present invention is illustrated. The illustrated cradle 30 is configured to removably receive a portable electronic device, such as a radiotelephone 12, therein. The illustrated cradle 30 includes a floor 32 and opposite first and second walls 33, 34 attached to, and extending from, the floor 32 in adjacent, spaced-apart relationship.

A first aperture 36 is formed within the first wall 33 and is configured such that a display panel 14 of the radiotelephone 12 is visible therethrough. In the illustrated embodiment, a second aperture 38 is formed within the first wall 33 adjacent the first aperture 36. The second aperture 38 is configured such that the keypad 16 of the radiotelephone 12 disposed within the cradle 30 is accessible.

An optical element 40 is secured to the cradle 30 and overlies the first aperture 36. The optical element 40 is configured to magnify the display panel 14 of the radiotelephone 12 disposed within the cradle 30. In a preferred embodiment illustrated in FIG. 3, the optical element 40 is secured to the cradle 30 within the first aperture 36 so as be substantially flush with the outer surface 33a of the first wall 33.

The optical element 40 may be a lens having one or more convex or concave elements. In addition, the optical element 40 may be formed from various transparent materials including, but not limited to, glass and plastics. An optical element according to the present invention may be utilized with various types and configurations of vehicle cradles and is not limited to the illustrated vehicle cradle.

Figure 4:
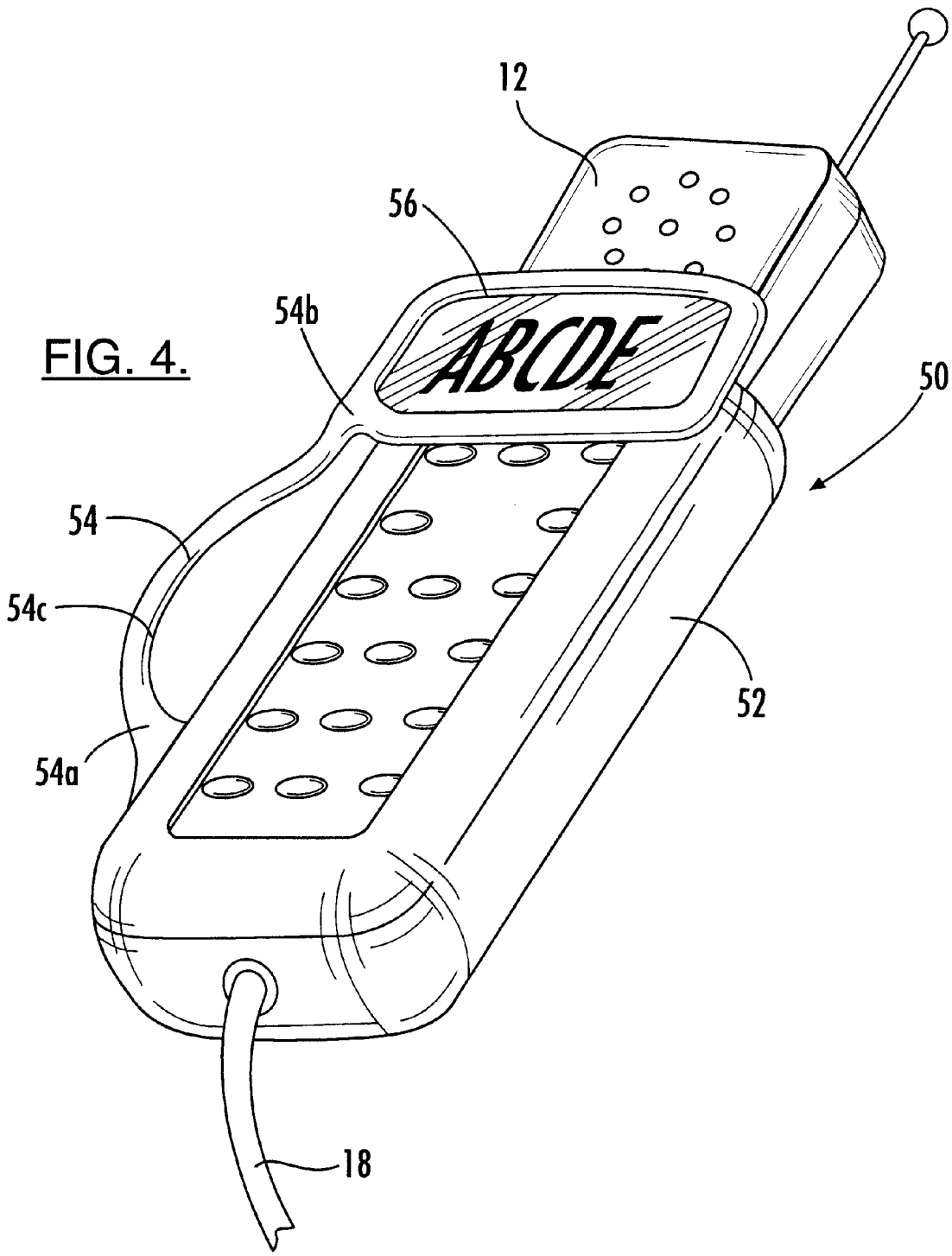
FIG. 4 is a perspective view of a vehicle cradle for supporting a portable radiotelephone according to another embodiment of the present invention.

Referring now to FIG. 4, an apparatus 50 for supporting portable electronic devices according to another embodiment of the present invention is illustrated. The illustrated apparatus 50 includes a cradle 52 that is configured to removably receive a radiotelephone 12 therein. An elongate, adjustably bendable arm 54 includes a proximal end 54a and an opposite distal end 54b. The arm proximal end 54a is secured to the cradle 52. An optical element 56 is secured to the distal end 54b of the arm 54, as illustrated. The optical element 56 is configured to magnify the display panel 14 of the radiotelephone 12 disposed within the cradle 52.

The arm 54 is preferably maneuverable to any of a plurality of positions relative to the cradle 52. Preferably, the arm 54 has a flexible, semi-rigid gooseneck shaft 54c that permits the optical element 56 to be easily maneuvered by a user. The arm 54 may be formed from various materials including, but not limited to, rubber, plastic and metal. Flexible gooseneck shafts are well known and need not de described further herein.

The optical element 56 may be a lens having one or more convex or concave elements. In addition, the optical element 56 may be formed from various transparent materials including, but not limited to, glass and plastics. An optical element according to the present invention may be utilized with various types and configurations of vehicle cradles and is not limited to the illustrated vehicle cradle.

Figure 5:
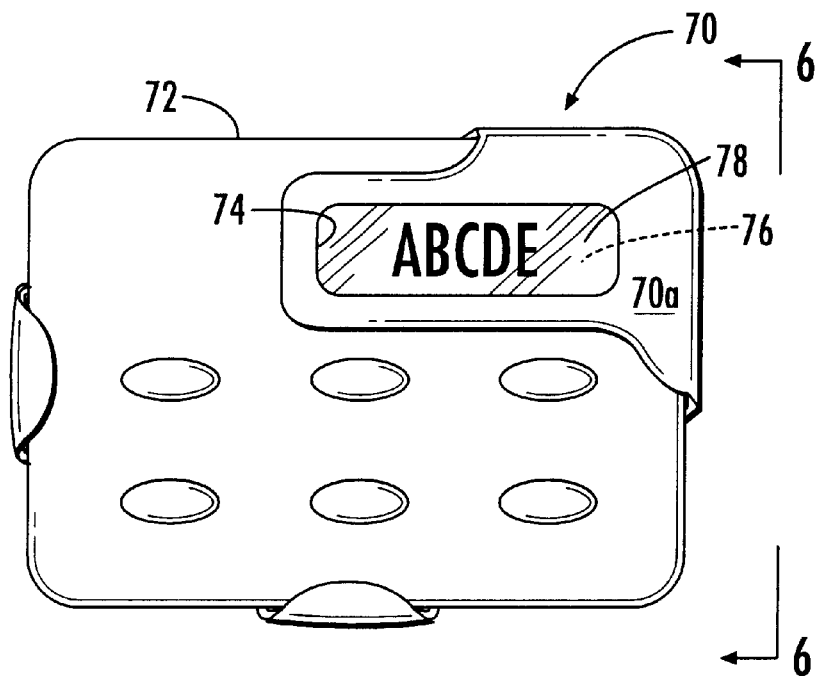
FIG. 5 is a front plan view of a holster for supporting an electronic device according to an embodiment of the present invention.
Figure 6:
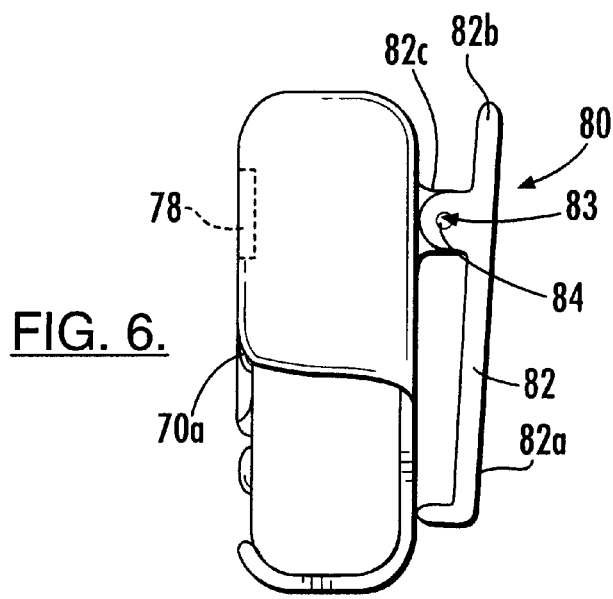
FIG. 6 is a side view of the holster of FIG. 5 taken along lines 6—6.

According to another embodiment of the present invention, a holster 70 for a portable electronic device 72, such as a pager, is illustrated in FIGS. 5 and 6. The illustrated holster 70 is configured to be worn by a user and to removably receive an electronic device therein.

The illustrated holster 70 includes an aperture 74 formed therein in a location such that a display panel 76 of the electronic device 72 disposed therewithin is visible. An optical element 78 that is configured to magnify the display panel 76 overlies the aperture 74. In a preferred embodiment illustrated in FIG. 6, the optical element 78 is secured to the holster 70 within the aperture 74 so as be substantially flush with the outer surface 70a of the holster 70.

The optical element 78 may be a lens having one or more convex or concave elements. In addition, the optical element 78 may be formed from various transparent materials including, but not limited to, glass and plastics. An optical element according to the present invention may be utilized with various types and configurations of electronic device holsters and is not limited to the illustrated holster 70.

The illustrated holster 70 includes a clip mechanism 80 which serves as means for removably attaching the holster 70 to an object, such as a person's belt or other article of clothing. The illustrated clip mechanism 80 is hinged to the holster 70 and is pivotable, relative to the holster 70, along a path of rotation between a closed position and an open position, as would be understood by one of skill in the art.

The illustrated clip mechanism 80 includes an elongated member 82 having opposite end portions 82a, 82b. The elongated member 82 is pivotally connected (at an intermediate portion 82c) to the holster 70 via a hinge 84 as illustrated. A biasing member, such as a spring 83, is coupled to the holster 70 and to the elongated member 82 and is configured to continuously urge the elongated member first end portion 82a towards the holster 70 as would be understood by one of skill in the art.

When in the closed position, the elongated member first end portion 82a is in adjacent, contacting relationship with the holster 70. When in an open position, the elongated member first end portion 82a is disposed at an angle relative to the holster 70. As would be understood by those of skill in the art, a user applies a force to the elongated member second end portion 82b in the direction of the holster 70 and against the force of the spring 83 to move the elongated member second end portion 82b to the open position.

The present invention is not limited to holsters with the illustrated clip mechanism 80. Various types of clip mechanisms may be utilized with electronic device holsters incorporating optical elements according to the present invention. For example, clip mechanisms such as those described in commonly assigned U.S. patent application Ser. No. 09/271, 051, filed Mar. 17, 1999, which is incorporated herein by reference in its entirety, may be utilized in accordance with the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for supporting a portable electronic device, comprising:
   a cradle configured to removably receive a portable electronic device therein;
   an elongated, adjustably bendable arm including a proximal end and an opposite distal end, wherein the proximal end of the arm is secured to the cradle, and wherein the arm is maneuverable to any of a plurality of positions relative to the cradle; and
   an optical element secured to the distal end of the arm, wherein the optical element is configured to magnify a display panel of a portable electronic device disposed within the cradle.

2. An apparatus according to claim 1 wherein the optical element comprises at least one of a convex lens and a concave lens.

3. An apparatus according to claim 1 wherein the arm comprises a flexible, semi-rigid gooseneck shaft.

4. An apparatus according to claim 1 wherein the electronic device is a radiotelephone.

5. A vehicle cradle for supporting a radiotelephone, comprising:
   an elongated flexible semi-rigid gooseneck shaft including a proximal end and an opposite distal end, wherein the proximal end of the gooseneck shaft is secured to the cradle, and wherein the gooseneck shaft is adjustably bendable to any of a plurality of positions relative to the cradle; and
   an optical element secured to the distal end of the gooseneck shaft, wherein the optical element is configured to magnify a display panel of a radiotelephone disposed within the cradle.

6. A vehicle cradle according to claim 5 wherein the optical element comprises at least one of a convex lens and a concave lens.

7. A holster for a portable electronic device, comprising an optical element configured to magnify a display panel of a portable electronic device disposed therewithin.

8. A holster according to claim 7 wherein the holster further comprises an aperture formed therein that is configured such that a display panel of an electronic device disposed therewithin is visible therethrough, and wherein the optical element overlies the aperture.

9. A holster according to claim 8 wherein the optical element is secured to the holster within the aperture.

10. A holster according to claim 7 wherein the optical element comprises at least one of a convex lens and a concave lens.

11. A holster according to claim 7 wherein the electronic device is a pager.

12. A holster according to claim 7 further comprising means for removably attaching the holster to an object.

13. A holster according to claim 12 wherein the means for removably attaching the holster to an object comprises:
   a clip hinged to the holster and pivotable, relative to the holster, along a path of rotation between a closed position and an open position, wherein the clip is in overlying, adjacent relationship with the holster when in the closed position, and wherein the clip is disposed at an angle, relative to the holster, when in the open position; and
   a biasing member, coupled to the holster and clip, that continuously urges the clip towards the closed position.

* * * * *